United States Patent Office 3,240,753
Patented Mar. 15, 1966

3,240,753
OXYMETHYLENE POLYMERS STABILIZED
WITH ALKYLENE BISPHENOLS
Thomas Joseph Dolce, Springfield, N.J., assignor to
Celanese Corporation of America, New York, N.Y., a
corporation of Delaware
No Drawing. Filed Apr. 20, 1965, Ser. No. 449,622
6 Claims. (Cl. 260—45.95)

This application is a continuation-in-part of patent application S.N. 792,280, filed February 10, 1959.

This invention relates to polymers which are structurally related to polyoxymethylene and particularly to polymers of high thermal stability. This invention also relates to a method for improving the thermal stability of polymers.

Polyoxymethylene polymers, having recurring

—CH$_2$O— units have been known for many years. They may be prepared by the polymerization of anhydrous formaldehyde or by the polymerization of trioxane which is a cyclic trimer of formaldehyde. Polyoxymethylene varies in thermal stability and in molecular weight, depending on its method of preparation.

High molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordination complexes with organic compounds, as described in U.S. Patent No. 2,989,506 by Donald E. Hudgin and Frank M. Berardinelli. Boron fluoride gas is also a rapid and effective catalyst, as disclosed in U.S. Patent No. 2,989,507 by Hudgin and Berardinelli.

Although polyoxymethylenes prepared by some methods are much more stable against thermal degradation than those prepared by other methods, it is nevertheless desirable for many uses that the thermal stability be increased.

It has now been found that there is extraordinary heat stability in an admixture of an alkylene bisphenol with an oxymethylene-cyclic ether copolymer containing from 60 to 99.6 mol percent of recurring oxymethylene units, said cyclic ether having at least two adjacent carbon atoms.

The admixture of an alkylene bisphenol with an oxymethylene homopolymer produces a product of improved thermal stability but not a product of the same order of tsability as the products of this invention.

It appears that the susceptibility of polyoxymethylene polymers to stabilization by the addition of alkylene bisphenols is greatly enhanced by incorporating into the polymer units derived from cyclic ethers having at least two adjacent carbon atoms.

Among the copolymers which are utilized in accordance with this invention are those having a structure comprising recurring units having the formula

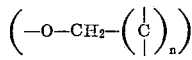

wherein $n$ is an integer from zero to 5 and wherein $n$ is zero in from 60 to 99.6 percent of the recurring units.

A preferred class of copolymers are those having a structure comprising recurring units having the formula (—O—CH$_2$—(CH$_2$)n—) wherein $n$ is an integer from zero to 2 and wherein $n$ is zero in from 60 to 99.6 percent of the recurring units. These copolymers are prepared by copolymerizing trioxane with a cyclic ether having the structure

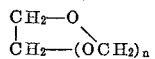

where $n$ is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, tetrahydrofuran, and butadiene monoxide.

The preferred catalysts used in the preparation of the desired copolymers are the boron fluoride coordinate complexes with organic compounds in which oxygen or sulfur is the donor atom.

The coordination complexes of boron fluoride may, for example, be a complex with a phenol, an ether, an ester, or a dialkyl sulfide. Boron fluoride dibutyl etherate, the coordination complex of boron fluoride with dibutyl ether, is the preferred coordination complex. The boron fluoride complex with diethyl ether is also very effective. Other boron fluoride complexes which may be used are the complexes with methyl acetate, with ethyl acetate, with phenyl acetate, with dimethyl ether, with methylphenyl ether and with dimethyl sulfide.

The coordination complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture, such as may be present in commercial grade reactants or may be introduced by contact with atmospheric air will not prevent polymerization, but should be essentially removed for best yields.

In a specific embodiment of this invention, the trioxane, cyclic ether and catalyst are dissolved in a common anhydrous solvent, such as cyclohexane, and permitted to react in a sealed reaction zone. The temperature in the reaction zone may vary from about 0° C. to about 100° C. The period of reaction may vary from about 5 minutes to about 72 hours. Pressures from subatmospheric to about 100 atmospheres, or more may be used, although atmospheric pressure is preferred.

It has been found that the relatively minor amounts of the cyclic ether other than trioxane used in the copolymerization reaction generally disappear completely from the reaction mixture. The required ratio of trioxane to cyclic ether in their reaction mixture may therefore be roughly predetermined for a desired mol ratio in the polymer by assuming that all of the cyclic ether is used up and by assuming a particular conversion level from previous experience under substantially comparable conditions.

The chemical constitution of the cyclic ether must also be considered. Thus, 1,3-dioxolane contains both an oxymethylene group and an oxyethylene group. Its incorporation into the copolymer molecule increases both the oxymethylene and the oxyethylene content of the polymer molecule.

In general, the cyclic ether is present in the reaction mixture in amounts between about 0.2 and about 30 mol percent, based on the total mols of monomer. The optimum proportion will depend on the particular copolymer desired, the expected degree of conversion and the chemical constitution of the cyclic ether used.

The copolymers produced from the preferred cyclic ethers in accordance with this invention have a structure substantially composed of oxymethylene and oxyethylene groups in a ratio from about 250:1 to about 1.5:1.

Upon completion of the polymerization reaction it is desirable to neutralize the activity of the polymerization catalyst since prolonged contact with the catalyst degrades the polymer. The polymerization product may be treated with an aliphatic amine, such as tri-n-butylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in U.S. Patent No. 2,989,509 by Donald E. Hudgin and Frank M. Berardinelli.

The alkylene bisphenols which may be used in accordance with this invention include those with alkyl substituents on the benzene rings. A suitable class of alkylene bisphenols includes compounds having from 1 to 4 carbon atoms in the alkylene group and having from 0 to 2 alkyl substituents on each benzene ring, each alkyl substituent having from 1 to 4 carbon atoms. Preferred species within this class of alkylene bisphenols include the 2,2'-alkylene-bis(4,6-dialkyl phenol) compounds and 4,4'-alkylene-bis(2,6-dialkyl phenol) compounds where, as indicated above, the alkylene group has from 1 to 4 carbon atoms and each alkyl substituent also has from 1 to 4 carbon atoms.

Preferred 2,2'-alkylene-bis(4,6-dialkyl phenol) compounds include
2,2'-methylene-bis(4-methyl-6-tertiary butyl phenol);
2,2'-methylene-bis(4-ethyl-6-tertiary butyl phenol);
2,2'-methylene-bis(4-propyl-6-tertiary butyl phenol);
2,2'-methylene-bis(4,6-ditertiary butyl phenol);
2,2'-ethylene-bis(4-methyl-6-propyl phenol); etc.

Preferred 4,4'-alkylene-bis(2,6-dialkyl phenol) compounds include
4,4'-methylene-bis(2-methyl-6-tertiary butyl phenol);
4,4'-methylene-bis(2-ethyl-6-tertiary butyl phenol);
4,4'-methylene-bis(2-propyl-6-tertiary butyl phenol);
4,4'-methylene-bis(2,6-ditertiary butyl phenol);
4,4'-ethylene-bis(2-methyl-6-propyl phenol); etc.

The alkylene bisphenol is generally admixed with the copolymer in amounts not exceeding 2%, based on the weight of the copolymer. Preferably, amounts between about 1 and about 2 weight percent are used.

The alkylene bisphenols are generally admixed intimately by being applied in solution to the finely divided solid polymer followed by evaporation of the solvent. Diethyl ether is an excellent solvent for this purpose. The admixture may also be made by milling the dry solids together or by dissolving both the polymer and the alkylene bisphenol in a common solvent, such as gamma butyrolactone and evaporating the solvent. If desired, the solid admixture of alkylene bisphenol and polymer may be milled in a plastograph.

The compositions of this invention may also include, if desired, plasticizers, fillers, pigments and other stabilizers.

EXAMPLE I

[Preparation of homopolymer]

Into a 5 liter 3-neck flask were placed 1,500 grams of molten and filtered trioxane and 1,500 grams of cyclohexane. The flask was fitted with a mechanical stirrer, a thermometer, and a condenser. The mixture was heated, and, when all of the trioxane was in solution at 58° C., the catalyst (0.32 ml. of $BF_3$ dibutyletherate in 50 ml. of cyclohexane) was added. The reaction was allowed to proceed for 24 hours at 58–59° C. after which 8.6 ml. of tributylamine was added. The polymer was filtered, washed twice with cyclohexane at 58–60° C. and twice with hot water at 90–95° C., and then filtered and dried. The yield was 420 grams or 20% of theoretical and the degradation rate at 222° C. was 3.7 weight percent per minute. Three grams of this homopolymer were slurried with a solution of 0.06 gram of 2,2'-methylene-bis(4-methyl-6-tertiary butyl phenol) in 15 ml. of diethyl ether. The solvent was evaporated as the slurry was stirred and the powder dried at 70° C. for a period of half an hour. A disc was compression molded from a 3 gram sample at 190° C. for 4 minutes at 1,500 p.s.i.

EXAMPLE II

[Preparation of copolymer]

Into a small sigma blade mixer (about 1 gallon capacity) were placed 3,361 grams of molten and filtered trioxane, 1,243 grams of cyclohexane, and 84 grams of 1,3-dioxolane (2.5 weight percent based on trioxane). The temperature was allowed to rise to 60° C. and when all of the trioxane was in solution 1.0 ml. of $BF_3$ dibutyletherate in 200 grams of cyclohexane was added. The reaction was allowed to continue for 2½ hours and the temperature varied from 58–61° C. After this period 5 ml. of tributylamine was added and the polymer was washed with acetone. The yield amounted to 1,509 grams or 45% of theory. The degradation rate on the raw polymer was 1.4 weight percent per minute.

Three grams of the 2.5/97.5 dioxolane/trioxane copolymer described above were slurried with a solution of 0.06 gram of 2,2'-methylene-bis(4-methyl-6-tertiary butyl phenol) in 15–20 ml. of ethyl ether. The solvent was evaporated as the slurry was stirred and the powder was dried at 65–70° for half an hour. A disc was compression molded from the three-gram sample at 190° C. for 4 minutes at a pressure of 1,500 p.s.i.

Thermal degradation rates were determined on the raw homopolymer and copolymer and upon the homopolymer and copolymer admixed with the bis-phenol. The results are shown in Table I.

Table I.—*Thermal degradation at 222° C. in percent per minute*

|  | Raw | With bisphenol |
|---|---|---|
| Homopolymer | 3.7 | 2.3 |
| Copolymer | 1.4 | <0.1 |

It may be seen that the addition of the bis-phenol reduced the degradation rate in the copolymer to less than the degradation level of the homopolymer after similar admixture.

Thermal degradation is determined at 222° C. in a circulating air oven in which the samples are maintained in open dishes on a turntable rotating at 3 r.p.m. and in which the samples may be weighed without removal from the oven.

In order to show that 4,4'-methylene-bis(2,6-ditertiary butyl phenol) is a very suitable alkylene bisphenol, a control (Example III) was made using 2,2'-methylene-bis-(4-methyl-6-tertiary butyl phenol) and a chain scission agent which was treated as specified. In Examples IV and V the alkylene bisphenol was substituted as indicated with the results reported below.

EXAMPLE III 0.5 wt. percent of 2,2'-methylene-bis(4-methyl-6-tertiary butyl phenol) and 0.5 wt. percent of cyanoguanidine were mixed with 50 grams of a polymer of 98% trioxane and 2% ethylene oxide. This polymer had been prepared in accordance with U.S. Patent No. 3,027,352 and the unstable terminal oxymethylene groups were removed in accordance with U.S. Patent No. 3,027,352 and the unstable terminal oxymethylene groups were removed in accordance with French Patent No. 1,287,151. These materials were stirred and were then milled in a plastograph under nitrogen for 10 minutes at 200° C. Discs having a diameter of 2" and a thickness of about 70 mils were molded at 180° C. The discs weighed 5.0 grams. The discs were then exposed in a circulating air oven to a temperature of 230° C. for the following periods with the following weight loss: 45 minutes—0.88 wt. percent; 5.75 hours—9.0 wt. percent; 15.0 hours—29.2 wt. percent. These results are considered to be excellent under the conditions specified.

EXAMPLE IV

Example III was repeated except that the alkylene bisphenol used was 1.0 wt. percent of 4,4'-methylene-bis(2,6-ditertiary butyl phenol). After identical treatment the weight losses were as follows: 45 minutes—0.97 wt. percent; 5.75 hours—7.0 wt. percent; 15.0 hours—20.0 wt. percent.

EXAMPLE V

The procedure of Example III was repeated except that 0.5 wt. percent of 4,4'-methylene-bis(2,6-ditertiary butyl phenol) was used as the alkylene bisphenol. After identical treatment the weight losses were as follows: 45 minutes—0.91 wt. percent; 5.75 hours—7.9 wt. percent; 15.0 hours—18.2 wt. percent.

As can be seen, Examples IV and V indicate that the bisphenol used in these examples gave excellent weight loss results indicating stabilized polymer.

It is to be understood that the foregoing detailed description is merely given by way of illustration and that many variations may be made therein without departing from the spirit of my invention.

The embodiments of the invention in which an exclusive property or privilege is claimed are defined as follows:

1. A stabilized polymer composition comprising a moldable oxymethylene-cyclic ether copolymer containing from 60 to 99.6 mol percent of recurring oxymethylene units, said cyclic ether having at least two adjacent carbon atoms, and a stabilizing amount of an alkylene bisphenol selected from the group consisting of 2,2'-alkylene-bis(4,6-dialkyl phenol) and 4,4'-alkylene-bis(2,6-dialkyl phenol), said alkylene bisphenol having from 1 to 4 carbon atoms in its alkylene group and in each of its alkyl groups.

2. A stabilized polymer composition comprising a moldable oxymethylene copolymer having a structure comprising recurring units having the formula

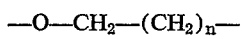

wherein $n$ is an integer from 0 to 5 and wherein $n$ is 0 in from 60 to 99.6% of the recurring units, and a stabilizing amount of an alkylene bisphenol selected from the group consisting of 2,2'-alkylene-bis(4,6-dialkyl phenol) and 4,4'-alkylene-bis(2,6-dialkyl phenol), said alkylene bisphenols having from 1 to 4 carbon atoms in its alkylene group and each of its alkyl groups.

3. A stabilized polymer composition comprising a moldable oxymethylene-cyclic ether copolymer containing from 60 to 99.6 mol percent of recurring oxymethylene units, said cyclic ether having at least two adjacent carbon atoms, and a stabilizing amount of an alkylene bisphenol selected from the group consisting of 2,2'-alkylene-bis(4,6-dialkyl phenol) and 4,4'-alkylene-bis (2,6-dialkyl phenol), said alkylene bisphenols having from 1 to 4 carbon atoms in its alkylene group and each of its alkyl groups, said polymer composition having a thermal degradation rate at 222° C. of less than 0.1 weight percent per minute.

4. A stabilized polymer composition comprising a moldable oxymethylene-cyclic ether copolymer containing from 60 to 99.6 mol percent of recurring oxymethylene units, said cyclic ether having at least two adjacent carbon atoms, and a stabilizing amount of an alkylene bisphenol selected from the group consisting of 2,2'-alkylene - bis(4,6 - dialkyl phenol) and 4,4'-alkylene-bis (2,6-dialkyl phenol), said alkylene bisphenols having from 1 to 4 carbon atoms in its alkylene group and each of its alkyl groups, said alkylene bisphenol being present in an amount not greater than 2%, based on the weight of the copolymer.

5. A stabilized polymer composition comprising a moldable oxymethylene-cyclic ether copoylmer containing from 60 to 99.6 mol percent of recurring oxymethylene units, said cyclic ether having at least two adjacent carbon atoms, and a stabilizing amount of a 2,2'-alkylene-bis(4,6-dialkyl phenol) having from 1 to 4 carbon atoms in its alkylene group and in each of its alkyl groups.

6. A stabilized polymer composition comprising a moldable oxymethylene-cyclic ether copolymer containing from 60 to 99.6 mol percent of recurring oxymethylene units, said cyclic ether having at least two adjacent carbon atoms, and a stabilizing amount of a 2,2'-methylene-bis-(4-methyl-6-tertiary butyl phenol).

No references cited.

LEON J. BERCOVITZ, *Primary Examiner.*